(12) United States Patent
Zhang

(10) Patent No.: US 11,881,099 B2
(45) Date of Patent: Jan. 23, 2024

(54) METHOD FOR LOCATING A NETWORK DEVICE IN A MESH NETWORK AND CORRESPONDING MESH NETWORK

(71) Applicant: KROHNE Messtechnik GmbH, Duisburg (DE)

(72) Inventor: Junshu Zhang, Ratingen (DE)

(*) Notice: Subject to any disclaimer, the term of this patent is extended or adjusted under 35 U.S.C. 154(b) by 181 days.

(21) Appl. No.: 17/320,995

(22) Filed: May 14, 2021

(65) Prior Publication Data

US 2021/0358276 A1 Nov. 18, 2021

(30) Foreign Application Priority Data

May 15, 2020 (DE) ...................... 10 2020 113 236.0

(51) Int. Cl.
*G08B 5/38* (2006.01)
*H04L 43/0864* (2022.01)
*H04W 4/02* (2018.01)
*H04W 4/029* (2018.01)

(52) U.S. Cl.
CPC ............ *G08B 5/38* (2013.01); *H04L 43/0864* (2013.01); *H04W 4/023* (2013.01); *H04W 4/029* (2018.02)

(58) Field of Classification Search
CPC . A61B 34/10; H04B 7/04; H04B 7/08; G16H 70/40; H04W 4/38; H04W 4/20; H04W 84/20; H04L 67/2857
See application file for complete search history.

(56) References Cited

U.S. PATENT DOCUMENTS

| 7,916,025 B2 | 3/2011 | Locker et al. |
| 2005/0041654 A1* | 2/2005 | Lee ..................... H04L 43/0811 370/386 |
| 2008/0002599 A1 | 1/2008 | Yau et al. |
| 2012/0309417 A1 | 12/2012 | Blom et al. |

(Continued)

FOREIGN PATENT DOCUMENTS

KR 20100073947 A 7/2010

OTHER PUBLICATIONS

Hanashi, Abdalla M., et al; "Performance Evaluation of Dynamic Probabilistic Flooding Under Different Mobility Models in MANETs"; 2007 International Conference on Parallel and Distributed Systems, IEEE; Hsinchu, Taiwan; Dec. 5, 2007; 6 Pages.

(Continued)

*Primary Examiner* — Iqbal Zaidi
(74) *Attorney, Agent, or Firm* — Patrick D. Duplessis

(57) ABSTRACT

A method for locating a network device in a mesh network includes the steps of: generating a message from a network device; storing a step value and an initial step value in the message; initializing the step value with the initial step value; sending the message to the mesh network; receiving the message is received at a further network device; and determining whether the message is classified as received for the first time. If the message is classified by the further network device as being received for the first time, the following additional steps are performed: adding a delta step value to the step value; determining a distance of the further network device from the network device from the step value changed in this way and the initial step value; and indicating the distance for locating the network device for a user at the further network device.

20 Claims, 2 Drawing Sheets

(56) References Cited

U.S. PATENT DOCUMENTS

| | | | |
|---|---|---|---|
| 2015/0029914 A1 | 1/2015 | Elliott et al. | |
| 2016/0119739 A1 | 4/2016 | Hampel et al. | |
| 2016/0178379 A1 | 6/2016 | Moraru et al. | |
| 2018/0020329 A1* | 1/2018 | Smith | H04W 4/08 |
| 2019/0356573 A1 | 11/2019 | Chirikov et al. | |
| 2023/0067430 A1* | 3/2023 | Yuan | H04W 74/0841 |

OTHER PUBLICATIONS

Jo, Chanwoong, et al.; "Multilateration method based on the variance of estimated distance in range-free localisation"; The Institution of Engineering and Technology; Electronic Letters, vol. 52, No. 12; Jun. 9, 2016; 2 Pages.

Lim, H., et al; "Flooding in wireless ad hoc networks"; Computer Communications, vol. 24, Issues 3-4; Elsevier Science Direct; Feb. 15, 2001; 12 Pages.

* cited by examiner

METHOD FOR LOCATING A NETWORK DEVICE IN A MESH NETWORK AND CORRESPONDING MESH NETWORK

TECHNICAL FIELD

The invention relates, on the one hand, to a method for locating a network device in a mesh network. Thereby, the mesh network is formed by the network device and at least one further network device. On the other hand, the invention relates to a mesh network comprising a network device and at least one further network device.

BACKGROUND

In a mesh network, each network device is connected to at least one other network device. A message from one network device, which is addressed to another network device, is forwarded through respective, directly connected network devices until it reaches the addressed network device. Forwarding a message by a network device includes receiving the message from a directly connected network device and then sending the message into the mesh network where it is received by network devices that are directly connected. A mesh network in which every network device is connected to every other network device is called a full mesh network.

Accordingly, a message in a mesh network propagates in propagation steps from one network device to an addressed network device. For example, if a message is addressed from a first network device to a second network device directly connected to it, the message from the first network device to the second network device requires at least one propagation step. For example, if a message is addressed from a first network device to a second network device that is reachable via at least a third network device, the message from the first network device to the second network device requires at least two propagation steps.

Often, mesh networks have a plurality of network devices, for example ten or more, which are often spatially arranged such that not all network devices are visible to a user from one position. This is often the case with mesh networks in industrial systems.

In practice, problems arise for a user of a mesh network. One problem is to alert the user to a problem with a network device that is not visible from the user's position. For example, the problem is an error that the network device has detected. Another problem is to enable, or at least facilitate, the user to locate the network device in the mesh network.

SUMMARY

Thus, one object of the present invention is to provide a method for locating a network device in a mesh network.

The object is achieved by a method having the features disclosed herein.

In the method according to the present invention, the network device performs the following method steps:
  generating a message.
  storing a step value and an initial step value in the message.
  initializing the step value with the initial step value.
  subsequently sending the message to the mesh network.

Further, the at least one other network device performs the following method steps.
  receiving the message.
  determining whether the message is classified as received for the first time.
  Only if the message is classified as received for the first time by the at least one further network device, does the at least one further network device perform the following method steps:
  adding a delta step value to the step value.
  determining a distance from the thus modified step value and the initial step value of the at least one further network device from the network device.
  indicating the distance for locating the network device to a user at the at least one further network device.

Accordingly, the message is first generated and then the step value and the initial step value are stored therein. In addition, further information and/or data can usually be stored in the message. Initializing the step value with the initial step value means that the initial step value is assigned to the step value. The initial step value is, for example, previously stored in the network device and has specified to it. For example, no value is initially assigned to the step value in the message when it is saved, but only when it is initialized with the initial step value.

The at least one other network device receives the message previously sent by the network device. For this, the message is transmitted from the network device to the at least one further network device. The network device and the at least one further network device are usually directly connected to each other for transmitting the message. In the case of a direct connection, no further network device is arranged between the network device and the at least one further network device.

Upon receipt, the at least one further network device first determines whether the message is classified as received for the first time by the at least one further network device. Only if this is the case, are the following method steps executed by the at least one further network device:

First, the delta step value is added to the step value. The delta step value is, for example, previously stored in the at least one further network device and has been specified to it.

Then the distance is determined from the step value changed in this way and the initial step value. For example, the distance is determined from the difference between the step value and the initial step value, and in this case is one delta step value.

Further, the distance is then indicated to a user at the at least one further network device for locating the network device.

By indicating the distance at the at least one further network device, the user is guided to the network device, even if the network device is spatially arranged in such a way that it is not visible to the user from his position. Only the at least one further network device must be visible to the user. This is also involves drawing the attention of the user.

In one embodiment of the method, it is provided in a further method step that from the at least one further network device the step value is replaced by the changed step value in the message and the message is then sent again into the mesh network. This method step is only executed if the at least one further network device classifies the message as received for the first time.

If the mesh network comprises another network device in addition to the network device and the at least one further network device, and this further network device is directly connected to the at least one further network device, then the message with the changed step value is received by the further network device. The network device and the further network device are indirectly connected, since the at least one further network device is arranged between them. The message is thus forwarded by the at least one further network device.

The further network device then performs the process steps that the at least one further network device also performs. The distance of the further network device from the network device is two delta step values. The distance from a further network device to the network device is always a multiple of the delta step value. For example, the further network device and the network device are not only indirectly connected to each other via the at least one further network device, but also in parallel via two further network devices. Over this path, the distance is then three delta step values. Preferably, however, distance is understood here to mean the minimum distance.

Accordingly, the advantageousness of the method increases with the number of further network devices, since the number of network devices that guide the user to the network device thus also increases.

In a further design of the method, it is provided that it is determined Whether a message is classified as received for the first time by the at least one further network device by providing each received message with an individual index and storing this index, comparing the index of the message with the indices already stored, and classifying the message as received for the first time only if its index is different from the indices already stored. The storing of the indices is preferably done in the at least one further network device. Accordingly, not the complete message but only an index uniquely identifying it is stored.

In a design of the method alternative to the above design, it is provided that it is determined whether a message is classified as received for the first time by the at least one further network device by storing messages received by the at least one further network device, comparing the message with the already stored messages, and classifying the message as received for the first time only if it is different from the already stored messages.

In a further design of the method, it is provided that the delta step value has the absolute value 1, preferably the value 1, and preferably the initial value has the value 0. If the initial value has the value 0, then it is convenient to store no initial value in the message and to initialize the step value with 0. This simplifies the determination of the distance, since the distance corresponds to the changed step value.

In a further design of the method, it is provided that it is first determined by the at least one further network device whether the step value has reached an end step value. Only if the step value has not yet reached the end step value is the message sent again into the mesh network by the at least one further network device. Preferably, the network device stores the end step value in the message. Accordingly, in this embodiment, two conditions must be met for the message to be retransmitted into the mesh network. First, the message must be classified by the at least one other network device as received for the first time. Second, the step value must not yet have reached the final step value.

In a further design, it is provided that, on the one hand, an identifier of the at least one further network device is stored in the message by the network device. The identifier is also stored by the at least one further network device. This also means that the identifier is stored in the at least one further network device. This is then the own identifier. Further, the at least one further network device first determines whether the identifier in the message is identical to its own identifier. If the identifier in the message is not identical to its own identifier, the at least one further network device classifies the message as not being received for the first time.

In a further development of the above design, only if the identifier in the message is identical to the own identifier, does the at least one further network device retransmit the message into the mesh network. If the design described before this further development is not taken into account, then two conditions must be met here for the message to be retransmitted into the mesh network. First, the message must be classified by the at least one further network device as being received for the first time. Second, the identifier in the message must be identical to its own identifier. If the preceding design is taken into account, a third condition is added that the step value must not yet have reached the end step value.

Preferably, several network devices have the same identifier. In this way, these network devices are combined into a network group and the message propagates only in this network group. The identifier is, for example, an address or part of a parent address.

A further design requires that the at least one further network device comprises a flashing light and is configured to flash the flashing light. Preferably, the flashing light is an LED. In this design, it is now provided that the distance is indicated by the at least one further network device flashing the flashing light with a number corresponding to the distance. In this design, a delta step value of 1 is suitable so that the flashing light indicates the distance in integer steps. Preferably, the indication of the distance is repeated.

In a further design, it is provided that an error message is stored by the network device in the message. Further, it is preferably determined by the at least one further network device whether an error message is stored in the message and, only if an error message is stored in the message, does the at least one further network device indicate the distance. Thus, the distance is only indicated if an error message is stored in the message. Preferably, the error message contains information about an error detected by the network device. Preferably, the at least one further network device not only indicates the distance to the user, but also the error message.

In a further design, it is provided that the following method steps are performed by the at least one further network device.

Starting a timer when the message is received.
Resetting and restarting the timer if another message sent by the network device is received.
Performing a comparison of a time value of the timer with a reference time value.
Classifying the message as received for the first time if the comparison results in a time value greater than the reference time value.

This design enables detection of a failure of the network device. It assumes that the network device regularly sends the message and thereafter this or other messages to the mesh network at a time interval, which is then no longer the case if the network fails. The reference time value is chosen to be at least as large as the time interval. Preferably, the reference time value is chosen to be larger than the time interval so that false detection of the failure due to a slightly longer than usual propagation time of a message is avoided.

Another object of the invention is to provide a mesh network that enables locating a network device in the mesh network.

The object is achieved by a mesh network having the features disclosed herein.

In the mesh network according to the invention, the network device is adapted:
to generate a message
  to store a step value and an initial step value in the message,
  to initialize the step value with the initial step value and
  to then transmit the message into the mesh network.
The at least one further network device is adapted:
1. to receive the message and
  to determine whether the message is classified as received for the first time.
Only if the message is classified as received for the first time by the at least one further network device is the at least one further network device adapted:
1. to add a delta step value to the step value,
  to determine a distance of the at least one further network device from the network device from the step value changed in this way and the initial step value, and
  to indicate the distance for locating the network device to a user at the at least one further network device.

Adapting the at least one further network device to determine whether the message is classified as received for the first time means that it is arranged to classify the message accordingly.

In one design of the mesh network, it is provided that the network device is additionally configured as the at least one further network device and/or the at least one further network device is additionally configured as the network device.

In a further design, it is provided that the network devices are configured as field devices.

In a further design, it is provided that the network device and/or the at least one further network device is/are adapted to execute the method described above.

The explanations regarding the method apply accordingly to the mesh network and vice versa.

BRIEF DESCRIPTION OF THE DRAWINGS

In detail, a multitude of possibilities are provided for designing and further developing the method and the mesh network. For this, reference is made to the following description of a preferred embodiment in conjunction with the drawing. The drawing shows.

DETAILED DESCRIPTION

Figure 1:
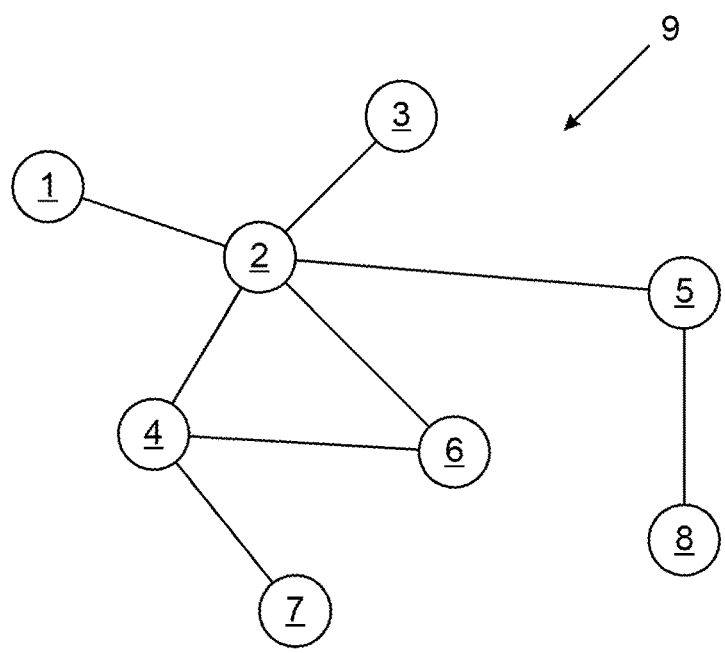
FIG. 1 illustrates a mesh network with one network device and seven further network devices.

FIG. 1 shows a spatial arrangement of a network device 1 and seven further network devices 2 to 8, which form a mesh network 9. The further network devices 2 to 8 have the same identifier, wherein the identifier is stored in each of the further network devices 2 to 8. Furthermore, the further network devices 2 to 8 each have an LED and are each configured to flash the LED.

A line between each two of the network devices 1 to 8 represents a direct connection between them, via which messages are transmitted. In the mesh network 9, each of the network devices 1 to 8 is directly connected to at least one of the other network devices 1 to 8. The mesh network 9 is not a full mesh network.

A message from one of the network devices 1 to 8, which is addressed to another of the network devices 1 to 8, is forwarded through each of the directly connected network devices 1 to 8 until it reaches the addressed network device 1 to 8. Forwarding a message through each of the network devices 1 to 8 includes receiving the message from an immediately connected network device 1 to 8, and then sending the message into the mesh network 9 in which the message is received by the immediately connected network devices 1 to 8. A message in the mesh network 9 thus propagates in one or more propagation steps from one of the network devices 1 to 8 to the network device 1 to 8 to which the message is addressed.

In the following, as an example, a message is generated by the network device 1, which is addressed to the further network devices 2 to 8 and sent into the mesh network 9.

Figure 2:
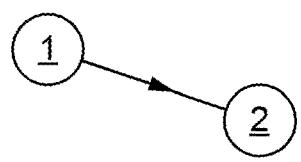
FIG. 2 illustrates the mesh network after a first propagation step.
Figure 3:
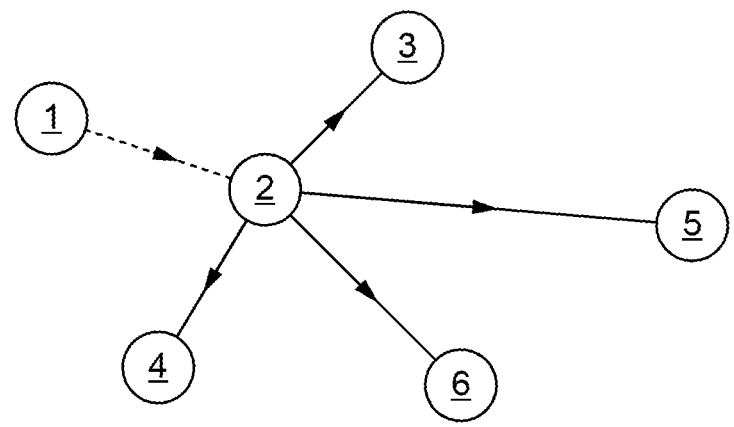
FIG. 3 illustrates the mesh network after a second propagation step.
Figure 4:
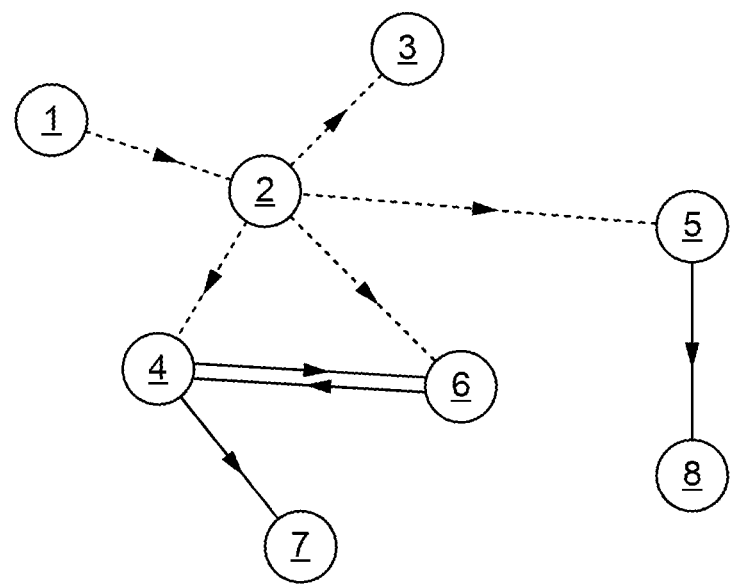
FIG. 4 illustrates the mesh network after a third propagation step.

The first propagation step is shown in FIG. 2, the second propagation step is shown in FIG. 3, and the third propagation step is shown in FIG. 4 by an arrow or multiple arrows, respectively. The parts of the mesh network 9 in which the message has not yet propagated are not shown in FIGS. 2 to 4. The propagation step preceding the propagation step shown in FIG. 3 is represented by a dashed line. The propagation steps preceding the propagation step shown in FIG. 4 are also shown as dashed lines.

In the first propagation step, see FIG. 2, the network device 1 performs the following method steps:
Generating the message.
1. Storing a step value, an initial step value with the value 0 and the identifier of the further network devices 2 to 8 in the message.
Initializing the step value with the initial step value, giving the step value the value 0.
Subsequent transmitting of the message into the mesh network 9.

The first further network device 2 performs the following method steps in the first propagation step:
Receiving the message.
Determining whether the message is classified as received for the first time in that the first further network device 2 provides each received message with an individual index and stores the same, compares the index of the message with the already stored indices and, only if its index is different from the already stored indices, is the message classified as received for the first time. Presently, this is the case.
1. Determining whether the identifier in the message is identical to the own identifier. Presently, this is the case.

Since the message is classified by the first further network device 2 as received to for the first time and also the identifier in the message is identical to its own identifier, the following steps are additionally executed by the first further network device 2 in the first propagation step:
1. Adding a delta step value to the step value, wherein the delta step value has a value of 1. Thus, the step value has a value of 1.
Determining a distance from the step value changed in this way and the initial step value of the first further network device 2 from the network device 1. The distance thus has the value 1 here.
Indicating the distance for locating the network device 1 to a user at the first further network device 2, by flashing from the first further network device 2 the LED with the number corresponding to the distance. Accordingly, the LED flashes one time periodically.

1. Replacing the step value with the changed step value in the message. The changed step value in the message therefore has the value two.

Retransmitting the message with the changed step value to the mesh network 9.

In the second propagation step, see FIG. 3, the first further network device 2 takes over the previously described function of the network device 1, and the network device 1 and the further network devices 3 to 6 take over the previously described function of the first further network device 2. In this case, the message is not classified by the network device 1 as received for the first time.

In the third propagation step, see FIG. 4, the further network devices 3 to 6 take over the previously described function of the network device 1 and the further network devices 2, 7 and 8 take over the previously described function of the first further network device 2, with the message being classified by the further network devices 2, 4 and 6 as not being received for the first time.

After the third propagation step, the further network devices 2 to 8 show the following distances in step values:

First further network device 2: 1
Second further network device 3: 2
Third further network device 4: 2
Fourth additional network device 5: 2
Fifth additional network device 6: 2
Sixth additional network device 7: 3
Seventh additional network device 8: 3

For example, if the user's position is between the sixth further network device 7 and the seventh further network device 8, then the number of times the LEDs on each of the further network devices 2 to 8 flash will guide the user to network device 1. For example, the LED of the seventh further network device periodically flashes 3 times.

The invention claimed is:

1. A method for locating a network device in a mesh network, wherein the mesh network is formed by the network device and at least one further network device, the method comprising:
   generating a message by the network device;
   storing a step value and an initial step value in the message;
   initializing the step value with the initial step value;
   sending the message to the mesh network;
   receiving the message at the at least one further network device; and
   determining whether the message is being received for the first time by the at least one further network device;
   only if the message is determined to have been received for the first time by the at least one further network device, performing the following steps by the at least one further network device:
      adding a delta step value to the step value such that the step value has a changed step value;
      determining a distance of the at least one further network device from the network device from the changed step value and the initial step value; and
      indicating the distance for locating the network device for a user at the at least one further network device.

2. The method according to claim 1, wherein, only if the message is determined to have been received for the first time by the at least one further network device, is the step value replaced by the changed step value in the message from the at least one further network device and is the message then sent again into the mesh network.

3. The method according to claim 1, further comprising:
   determining whether the message is determined to have been received for the first time by the at least one further network device by providing each received message with an individual index by the at least one further network device and storing the individual index, comparing the index of the message with already stored indices and determining that the message has been received for the first time only if the individual index is different from the already stored indices.

4. The method according to claim 1, further comprising:
   determining whether the message has been received for the first time by the at least one further network device by comparing the message with already stored messages and determining that the message has been received for the first time only if the message is different from the already stored messages.

5. The method according to claim 1, wherein the delta step value has the absolute value 1 and the initial step value has the value 0.

6. The method according to claim 1, further comprising:
   determining by the at least one further network device whether the changed step value has reached a final step value; and
   only if the changed step value has not yet reached the final step value, is the message retransmitted into the mesh network by the at least one further network device.

7. The method according to claim 1, wherein an identifier of the at least one further network device is stored in the message by the network device;
   wherein the identifier is stored by the at least one further network device;
   wherein the at least one further network device determines whether the identifier in the message is identical to an identifier of the at least one further network device; and
   wherein if the identifier in the message is not identical to the identifier of the at least one further network device, the at least one further network device classifies the message as not being received for the first time.

8. The method according to claim 7, wherein, only if the identifier in the message is identical to the own identifier, is the message retransmitted into the mesh network by the at least one further network device.

9. The method according to claim 1, wherein the at least one further network device has a flashing light and is designed to flash the flashing light; and
   wherein the distance is shown in that the at least one further network device flashes the flashing light with a number corresponding to the distance.

10. The method according to claim 1, wherein an error message is stored in the message by the network device and/or is determined by the at least one further network device whether an error message is stored in the message; and
    wherein only if an error message is stored in the message, is the distance indicated by the at least one further network device.

11. The method according to claim 1, wherein if the message is received from the at least one further network device, a timer is started;
    wherein if a further message sent by the network device is received, the timer is reset and restarted;
    wherein a comparison of a time value of the timer with a reference time value is performed; and wherein if the comparison results in a time value greater than the reference time value, the message is classified as received for the first time.

12. A mesh network, comprising:
a network device; and
at least one further network device;
wherein the network device is designed to:
   generate a message;
   store a step value and an initial step value in the message;
   the step value with the initial step value; and
   then transmit the message into the mesh network;
wherein the at least one further network device is adapted to:
   receive the message; and
   determine whether the message is being received for the first time;
wherein the at least one further network device is adapted, only if the message is determined to have been received for the first time, to:
   add a delta step value to the step value such that the step value has a changed step value;
   determine a distance of the at least one further network device from the network device from the changed step value and the initial step value; and
   indicate the distance for locating the network device to a user at the at least one further network device.

13. The mesh network according to claim 12, wherein the network device is additionally designed like the at least one further network device and/or the at least one further network device is additionally designed like the network device.

14. The mesh network according to claim 12, wherein the network devices are designed as field devices.

15. The mesh network according to claim 12, wherein the at least one further network device is configured such that, only if the message is determined as having been received for the first time, is the step value replaced by the changed step value in the message from the at least one further network device and is the message then sent again into the mesh network.

16. The mesh network according to claim 12, wherein the at least one further network device is configured to determine whether the message is received for the first time by providing each received message with an individual index, storing the individual index, comparing the individual index of the message with the already stored indices, and determining that the message has been received for the first time only if the individual index is different from the already stored indices.

17. The mesh network according to claim 12, wherein the at least one further network device is configured to determine whether the message has been received for the first time by comparing the message with already stored messages and determining that the message has been received for the first time only if the message is different from the already stored messages.

18. The mesh network according to claim 12, wherein the at least one further network device is configured to determine whether the step value has reached a final step value, and only if the step value has not yet reached the final step value, is the message retransmitted into the mesh network by the at least one further network device.

19. The mesh network according to claim 12, wherein an identifier of the at least one further network device is stored in the message by the network device;
   wherein the identifier is stored by the at least one further network device;
      wherein the at least one further network device determines whether the identifier in the message is identical to an identifier of the at least one further network device; and
      wherein if the identifier in the message is not identical to the identifier of the at least one further network device, the at least one further network device classifies the message as not being received for the first time.

20. The mesh network according to claim 19, wherein, only if the identifier in the message is identical to the own identifier, is the message retransmitted into the mesh network by the at least one further network device.

* * * * *